(12) United States Patent
Foladare et al.

(10) Patent No.: US 6,212,383 B1
(45) Date of Patent: *Apr. 3, 2001

(54) METHOD AND APPARATUS FOR UPDATING NETWORK ROUTING USING INTEGRATED INTERNET/TWO-WAY PAGING

(75) Inventors: Mark Jeffrey Foladare, Kendall Park; Shelley B. Goldman, East Brunswick; Roy Philip Weber, Bridgewater, all of NJ (US)

(73) Assignee: AT&T Corp., Middletown, NJ (US)

( * ) Notice: This patent issued on a continued prosecution application filed under 37 CFR 1.53(d), and is subject to the twenty year patent term provisions of 35 U.S.C. 154(a)(2).

Subject to any disclaimer, the term of this patent is extended or adjusted under 35 U.S.C. 154(b) by 25 days.

(21) Appl. No.: 09/213,415

(22) Filed: Dec. 17, 1998

Related U.S. Application Data

(63) Continuation of application No. 08/683,020, filed on Jul. 16, 1996.

(51) Int. Cl.$^7$ ........................................... H04Q 7/20
(52) U.S. Cl. ..................... 455/445; 455/461; 455/417
(58) Field of Search .......................... 455/445, 461, 455/417

(56) References Cited

U.S. PATENT DOCUMENTS

| | | | |
|---|---|---|---|
| 5,742,668 | * | 4/1998 | Pepe et al. ........................ 455/461 |
| 5,742,905 | * | 4/1998 | Pepe et al. ........................ 455/461 |

* cited by examiner

*Primary Examiner*—David R. Hudspeth
*Assistant Examiner*—Daniel Abebe

(57) ABSTRACT

Managing, in a two-way paging communication system, paging menus containing paging-menu options, comprises receiving, from a subscriber, paging-menu options. A subscriber then sends information including a first set of callers and a second set of callers, and first and second paging menu are configured accordingly.

16 Claims, 5 Drawing Sheets

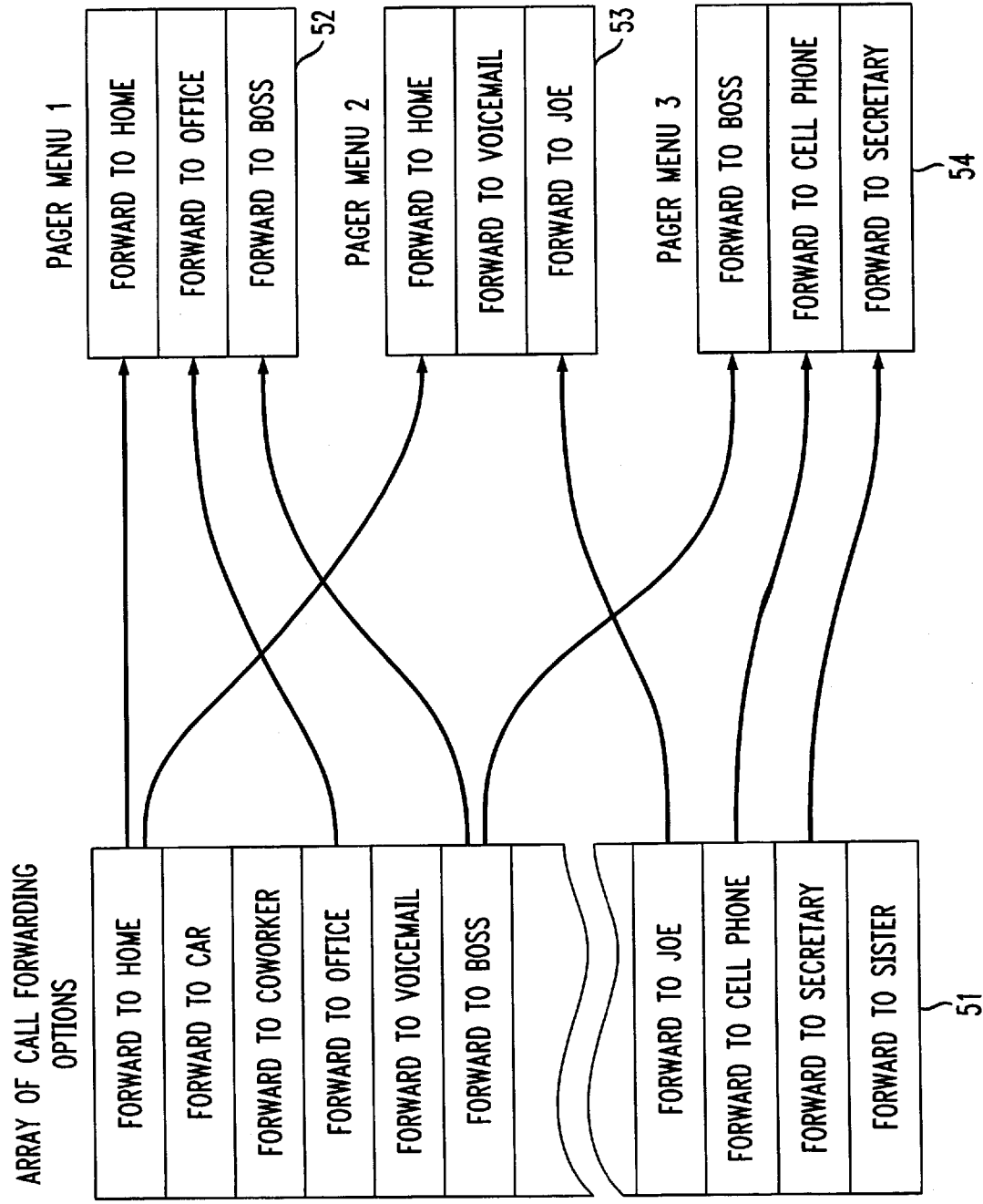

METHOD AND APPARATUS FOR UPDATING NETWORK ROUTING USING INTEGRATED INTERNET/TWO-WAY PAGING

CROSS REFERENCE TO RELATED APPLICATIONS

The present application is a continuation of U.S. patent application Ser. No. 08/683,020, filed on Jul. 16, 1996 and entitled METHOD AND APPARATUS FOR UPDATING NETWORK ROUTING USING INTEGRATED INTERNET/TWO-WAY PAGING.

TECHNICAL FIELD

This invention relates to two-way paging systems, and more particularly to a system for subscriber configuration of the call routing menu options displayed on a two-way pager in a paging communication system.

BACKGROUND OF THE INVENTION

Establishing communications with a called party becomes a problem when that party is mobile. In general, persons wishing to contact a particular party initiate a call to a specific telephone associated with that party, such as the party's home telephone. A disadvantage of this method of communication is that parties are not always in close proximity to their home telephone, or for that matter, in close proximity to any telephone. This presents a problem to persons who need to contact the mobile party immediately, and regardless of that party's location.

Several technologies have developed in an effort to solve the problem of establishing communication with a mobile party. These include call forwarding, paging, and cellular systems. However, each of these technologies has drawbacks which prevent seamless and ubiquitous communication.

Call forwarding is a well-known technique whereby an individual who plans to be away from an associated telephone can redirect calls to an alternate telephone. For example, an office worker planning to go on vacation could redirect calls to an office mate's telephone. Such a system, although desirable, is inflexible. It requires that the forwarding party access a telephone to activate and deactivate the call forwarding, and to change the forwarding number. This inflexibility is particularly harsh on those parties that require frequent changes to their forwarding number, such as a traveling salesman who is on the road and would like to receive calls from potential buyers.

Moreover, present call forwarding schemes make inefficient use of network resources. Calls must be sent to the forwarding party's end office before they are redirected. Thus, for example, when a party forwards calls from the party's home telephone in California to a relative's telephone in New Jersey, calls from New York to the party's home telephone will be routed to California before being forwarded to New York. Such a process unnecessarily ties up network resources from New York to California to complete a call from New York to New Jersey.

In a paging system, a mobile individual carries a portable pager. Typically, the pager is assigned a telephone number and is capable of receiving a predetermined radio signal. When a caller dials the pager's number, the predetermined radio signal is broadcast and the pager responds to the signal by activating an audible and/or visual alarm. The alarm serves to alert the mobile individual that an attempt to contact her has been made. Often, the caller's telephone number will be included in the radio signal so that the pager can record the caller's number and the called party can initiate a return call at some later time. One of the drawbacks of past paging system is that they do not usually support two-way communication. Thus, in a typical paging scenario, the called party must relocate and initiate a return call to establish full two-way communication with the calling party. Such relocation may be inconvenient and untimely resulting in "telephone tag"—situations in which two individuals periodically try to contact one another and fail because the other person is unavailable.

Another drawback of past paging systems is the delay associated with the paging queue. In general, a paging service can only transmit one page at a time. However, a service usually receives many paging requests at once. Consequently, a queue builds up at the service's broadcast facility and a delay in paging throughput times results. This problem is compounded in paging services that offer national coverage to their subscribers. In such services a subscriber's pages are broadcast from several facilities, and therefore a delay in throughput times results at each facility.

Cellular systems offer an answer to the relocation problems present in call forwarding systems and paging systems but introduce a host of new problems. A typical cellular phone is a wireless two-way voice communication device that can be carried on an individual person. Typically, each cellular phone user subscribes to service with a carrier in a particular geographic region serviced by that carrier. Calls to the subscriber, when the subscriber is in the home region, are easily completed since such calls are routed through a Mobile Telephone Switching Office (MTSO) serving their home region. However, when a subscriber is located in a different region, the subscriber is designated a "roamer", and call completion becomes more difficult because it is not known, a priori, through which MTSO to route the call.

The roamer problem may be overcome by having the roaming subscriber notify the "home MTSO" that she will be located in another region. This allows the necessary information to be transmitted from the "home MTSO" to the "host MTSO" so that the "host MTSO" can route the subscriber's calls. This "cellular call forwarding", however, introduces problems similar to those associated with traditional call forwarding. Moreover, all cellular communications—including those within the home region—suffer from a sensitivity to noise, precluding guaranteed high quality communications.

Given the problems associated with the prior call forwarding, paging, and cellular systems, there is a need to provide a system that will assure ubiquitous high quality communications with mobile parties.

The invention disclosed in the M. J. Foladare 2-13-13-17 application, cited hereinabove, addresses the foregoing disadvantages in prior systems used to communicate with mobile individuals. The Foladare 2-13-13-17 invention disclosed a system for communicating with a mobile individual having an assigned Personal Telephone Number (PTN) wherein the mobile individual is paged whenever calls are made to the PTN and uses a two-way pager to transmit a forwarding number for such received calls on a call by call basis. In this manner, the invention overcame the disadvantages of the prior systems.

The Foladare 3-14-8-13 invention also disclosed a system which employed a two-way paging technique to overcome the disadvantages present in the prior systems used to communicate with mobile individuals, while minimizing the time required to establish such communication. In accordance with that invention, a mobile person is equipped with a two-way pager and assigned a PTN. The mobile person uses the pager to transmit a forwarding telephone number to a paging service. The paging service relays the forwarding number to a Customer Routing Point (CRP) where the number is stored. Thereafter, whenever a call is placed to the mobile person's PTN, the terminating number is retrieved from the CRP and is used to forward the call to a terminating telephone. The Foladare 3-14-8-13 invention further disclosed an alternative to the call forwarding technique of the Foladare 2-13-13-17 invention. While the Foladare 2-13-13-17 invention disclosed a bridging or merging technique for the forwarding of calls, the Foladare 3-14-8-13 invention disclosed a rerouting technique for the forwarding of calls.

In sum, the Foladare 2-13-13-17 invention allows a mobile party to use a two-way pager to respond to calls on a "call by call" basis, designating a forwarding number for each call upon reception of a page announcing the call. The Foladare 3-14-8-13 invention, in contrast, allows a mobile party to "register" a forwarding number so that calls are automatically forwarded to the registered number, thereby eliminating the need to page the mobile party upon receipt of each call. In accordance with the Foladare 3-14-8-13 invention, the party may still change the forwarding number wherever and whenever the party wants, but need not respond on a call by call basis.

While the "registration" mode of the Foladare 3-14-8-13 invention provides quicker call routing than does the "call by call" mode of the Foladare 2-13-13-17 invention, the flexibility provided by the call by call mode—allowing call forwarding tailored to each individual call—makes that mode attractive to many mobile users.

Many two-way pagers include, instead of or in addition to a keypad which can be used to manually enter forwarding telephone numbers, a menu feature which provides a list of "speed-dial" options from which the mobile party can choose for forwarding calls on a call by call basis. These options might include, for example, "forward to office" or "forward to secretary." The use of such menus lessens the call routing delay associated with call by call mode.

The menus on available two-way pagers, however, often are capable of displaying only a limited number of options (e.g., 3 or 4). Furthermore, notwithstanding any pager-defined menu limitation, it would be cumbersome for the mobile party to have dozens of call forwarding options to scroll through each time an incoming page is received. On the other hand, limiting the menu to the same, static 3 or 4 options diminishes the utility of the call forwarding menu to the mobile party. Thus, it is desirable to make the menu options which are available on the two-way pager when the pager is in call by call mode easily configurable by the mobile party.

SUMMARY OF THE INVENTION

The present invention provides subscribers to two-way paging systems with greater call forwarding management capabilities than have heretofore been available, by allowing subscribers to update call routing menu choices on a semi-real time basis through the use of a data network, such as, e.g., a graphical user interface (GUI) screen on the Internet.

In accordance with the present invention, a subscriber can configure a call routing/forwarding menu for display on the subscriber's two-way pager. The subscriber can then choose from among the options in this menu each time a call is placed to the subscriber's personal telephone number (PTN). The call forwarding menu is stored in a customer routing point (CRP) database record associated with the subscriber and/or the subscriber's PTN, and is either downloaded upon creation to the subscriber's two-way pager for long-term storage in the two-way pager's memory, or downloaded to the two-way pager each time a call is made to the subscriber's PTN. In an alternative embodiment of the present invention, the subscriber can configure multiple call routing menus, and designate for each menu the caller(s) to which the menu corresponds. Thus, when a call is made to the subscriber's PTN, a determination is made as to the identity of the caller, and the appropriate call forwarding menu is then displayed on the subscriber's two-way pager.

BRIEF DESCRIPTION OF THE DRAWINGS

FIG. 5 depicts multiple call forwarding menus, each to be used in conjunction with particular designated calls, which might be configured by a subscriber from an array of call forwarding choices in accordance with the present invention.

DETAILED DESCRIPTION

Figure 1:
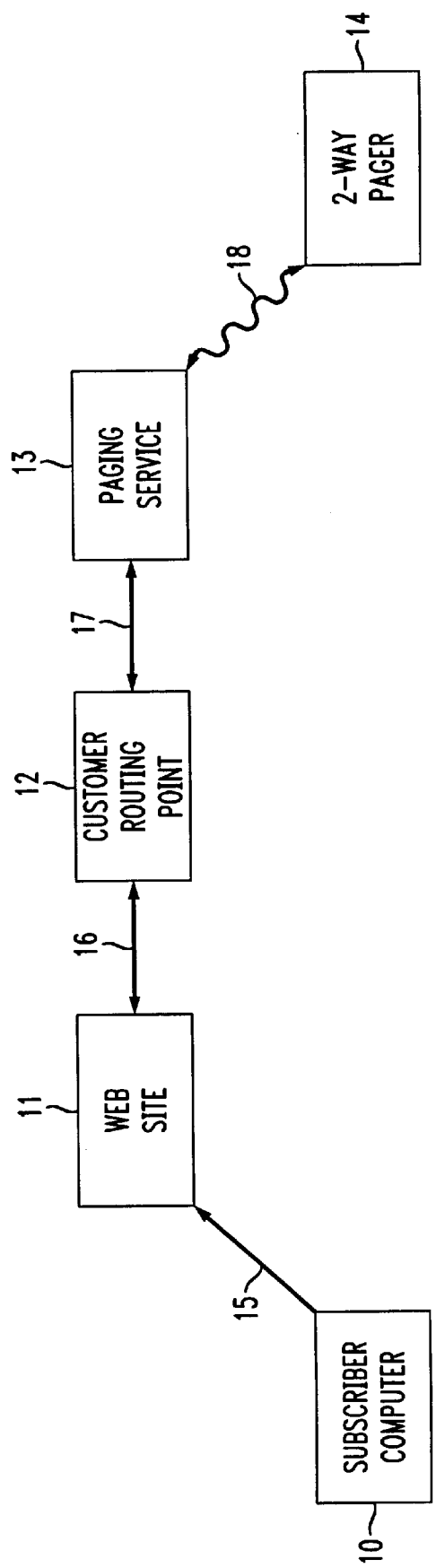
FIG. 1 is a block-schematic diagram of a paging network routing management system in accordance with the present invention.

Referring to FIG. 1, there is shown a block diagram of a paging network routing management system incorporating the present invention. In accordance with the invention, a subscriber to a two-way paging system is able to manage the menu choices for call forwarding that are displayed on the subscriber's two-way pager 14. The subscriber uses a processor-based computing device 10, such as a personal computer, to communicate with a data network 11 which provides access to a Customer Routing Point (CRP) 12 having a database containing call forwarding data related to the subscriber's unique personal telephone number (PTN). The data network 11 could be, for example, a World Wide Web site on the Internet with a graphical user interface (GUI).

The subscriber's computing device 10 and the CRP 12 are coupled to the data network 11 via communication couplings 15 and 16, respectively. The communication couplings 15 and 16, and all communication couplings hereinafter described, may take the form of a telephone line, twisted pair line, coaxial cable, fiber optic line, wireless link, or any other type of communication coupling.

The subscriber, via the data network 11, updates the call forwarding information associated with the subscriber's PTN in the CRP database by selecting the options which are to appear as the menu choices for call forwarding on the subscriber's pager 14. The updated menu options are relayed to the subscriber's pager 14 via a paging service 13. The paging service 13 is coupled to the CRP 12 via a communication coupling 17. The paging service 13 communicates with the pager 14 via a wireless link 18.

In selecting the options to be displayed on the pager 14 menu, the subscriber can, e.g., choose from a larger set of options already stored in the CRP database, modify existing options, and/or create new call forwarding options. The number of options that the subscriber may choose to include in the pager 14 menu at a given time depends upon, for example, the subscriber's preferences for menu size and the limitations on the pager menu size imposed by the pager 14, the paging service 13 and/or the CRP 12. The subscriber might choose, for example, to include these 3 options in the menu: (1) forward to home; (2) forward to office; and (3) forward to secretary.

Figure 2:
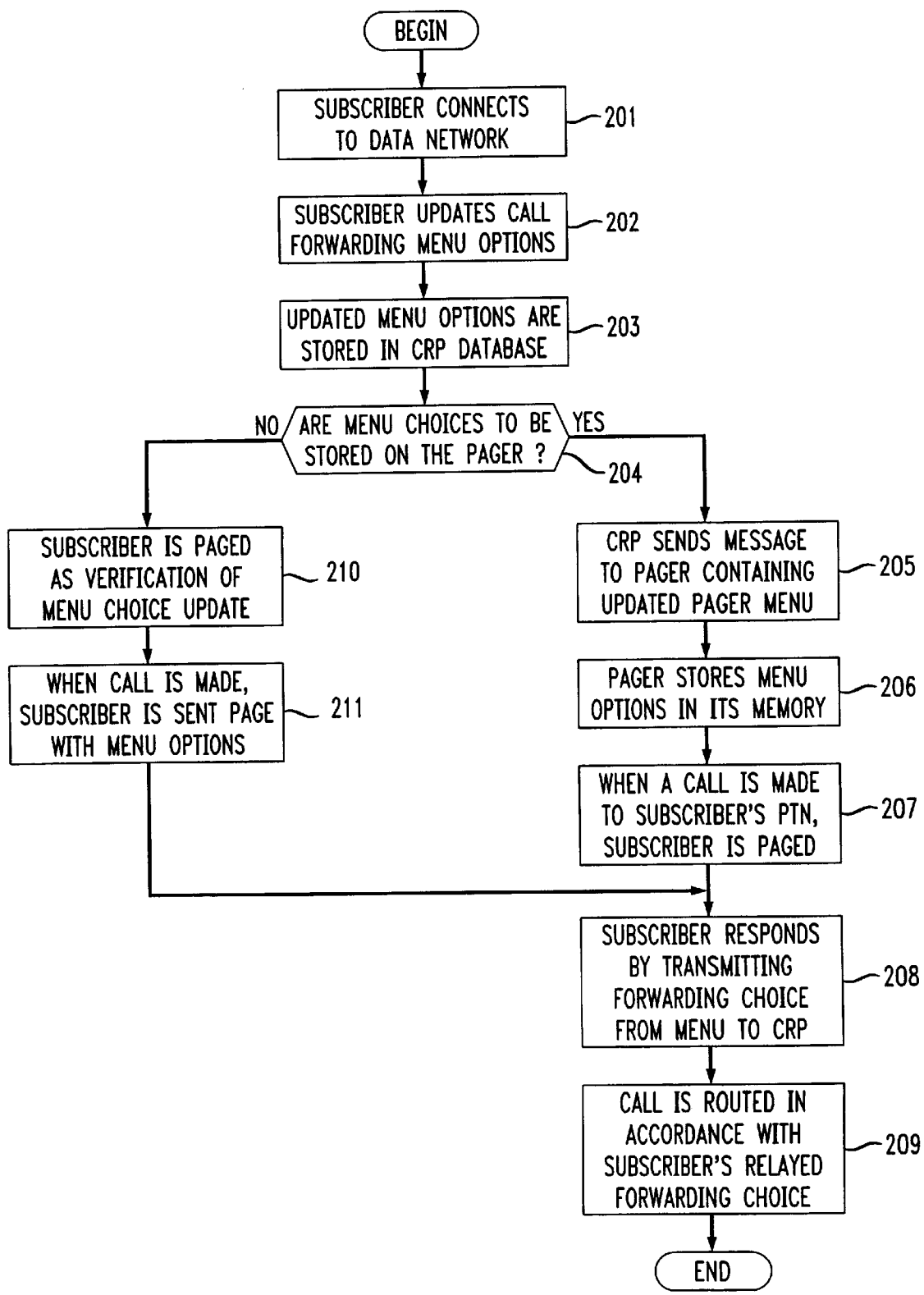
FIG. 2 is a flowchart which depicts the steps performed in management of two-way paging network routing according to one embodiment of the present invention.

FIG. 2 is a flowchart which depicts the steps performed in management of two-way paging network routing according to one embodiment of the present invention. In step 201, the subscriber, via a computing device 10, connects to a data network 11 for access to a database record containing paging call forwarding data related to the subscriber's PTN. The subscriber then, in step 202, updates the menu options to be displayed on the subscriber's pager 14. When the subscriber has completed the update, the new data is stored in the CRP's 12 database (step 203).

The subsequent steps to be performed depend upon whether or not the pager menu choices are to be stored for an extended period in the pager's 14 memory, or whether the pager menu choices are to be downloaded to the pager 14 each time a call to that pager is made (step 204). The choice between these configurations of the present invention may depend upon, e.g., the design limitations of the particular 2-way pager 14 being employed.

If the pager menu options are to be stored on the pager 14 itself, then the CRP 12, following update of the pager menu selections by the subscriber, sends a message to the two-way pager 14, via the paging service 13, containing the updated call forwarding menu options (step 205). The pager 14 then, in step 206, stores these menu options in its memory.

Thereafter, when a call is made to the subscriber's PTN, the subscriber is notified of the call, via a page, as discussed in Foladare 2-13-13-17 (step 207). The subscriber responds to the page by keying in, via the subscriber's pager 14, the number corresponding to the desired call forwarding option from the pager's menu, and this menu selection number is then relayed to the CRP 12, via the paging service 13 (step 208). For further description of the transmission of a forwarding signal from the pager, see the Foladare 2-13-13-17 disclosure.

The call is then routed to the destination corresponding to the relayed menu choice, in accordance with the call forwarding procedures disclosed in Foladare 2-13-13-17 and Foladare 3-14-8-13 (discussed above) (step 209).

If the selected call forwarding menu options are to be downloaded to the pager 14 each time a call to the pager 14 is made rather than stored in the pager's 14 memory long-term, then following update of the menu choices in the CRP's 12 database (step 203), it may be desirable to provide the subscriber with verification of the update via a paging message (step 210). Subsequently, each time a call to the subscriber's PTN is made, the subscriber is notified of the call via a page, as discussed in Foladare 2-13-13-17, and, included in the paging message are the current call forwarding menu options (step 211). The subscriber then selects a menu option and the call is routed accordingly (steps 208 and 209), as discussed above.

Figure 3:
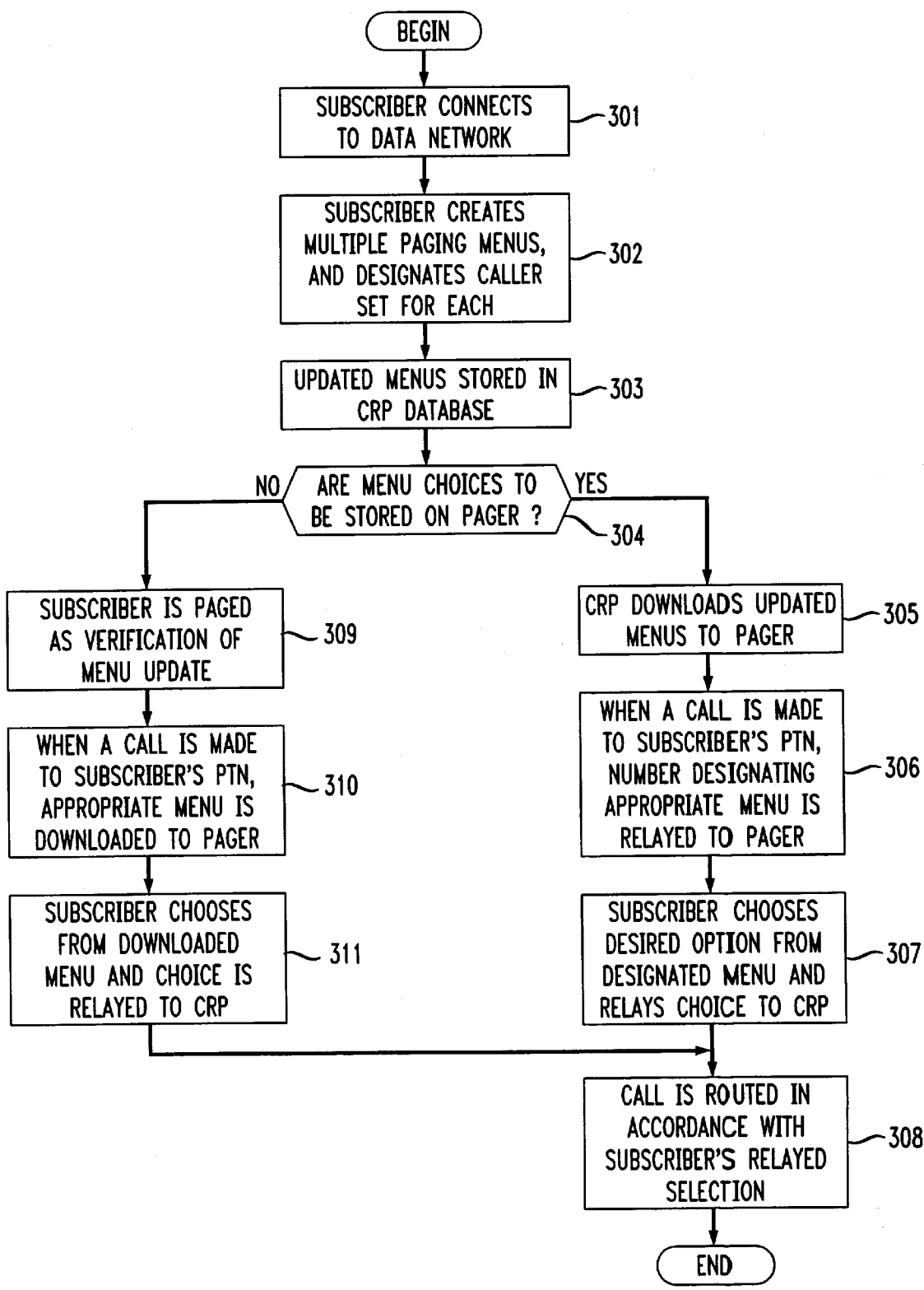
FIG. 3 is a flowchart which depicts the steps performed in management of two-way paging network routing according to a second embodiment of the present invention.

FIG. 3 is a flowchart which depicts the steps performed in management of two-way paging network routing according to a second embodiment of the present invention. In accordance with this second embodiment, the subscriber, rather than configuring a single call forwarding menu to be displayed on the subscriber's pager 14 in conjunction with all subsequent calls to the subscriber's PTN, configures multiple call forwarding menus, and designates for each the caller(s) with which the menu is associated. For example, the subscriber may configure a first menu, having the choices:

(1) forward to home
(2) forward to car phone
(3) forward to beach house and designate that this menu is to be used in conjunction with certain enumerated callers (e.g., the subscriber's spouse, the subscriber's parents, etc.). The subscriber may also designate a second menu, having the choices:

(1) forward to office
(2) forward to secretary
(3) forward to receptionist and designate that this menu is to be used as the default menu in conjunction with calls received from all other callers. Identification of callers can be made using, e.g., designated personal identification numbers (PINs), voice recognition, the caller's telephone number (automated number identification or ANI), or other caller identification techniques.

Referring to FIG. 3, the subscriber, as in the embodiment of the invention discussed above in conjunction with FIG. 2, via a computing device 10, connects to a data network 11 for access to a database record containing paging call forwarding data related to the subscriber and/or the subscriber's PTN (step 301). The subscriber then, in step 302, performs a menu update, configuring multiple pager call forwarding menus, and designating for each the caller(s) to which the menu applies. When the subscriber has completed this menu update, the new menu data is stored in the CRP's 12 database (step 303).

If (step 304) the menus configured by the subscriber are to be stored long-term in the subscriber's pager 14, then, in step 305, the updated menus are downloaded, via the paging service 13, to the pager 14. Subsequently, when a call is made to the subscriber's PTN, the CRP 12 identifies the caller and includes in the paging message (sent to the pager 14 via the paging service 13, as described in Foladare 2-13-13-17) a menu designation number, indicating which of the paging menus is to be displayed by the pager 14 in conjunction with that particular call (step 306). The subscriber then responds to the page by choosing the desired option from the designated menu and transmitting this choice to the CRP 12 via the paging service 13 (step 307). The call is then routed to the destination corresponding to the relayed menu choice, in accordance with the call forwarding procedures disclosed in Foladare 2-13-13-17 and Foladare 3-14-8-13 (discussed above) (step 308).

If the selected call forwarding menu options are to be downloaded to the pager 14 each time a call to the pager 14 is made rather than stored in the pager's 14 memory long-term, then following update of the menu choices in the CRP's 12 database (step 303), it may be desirable to provide the subscriber with verification of the update via a paging message (step 309). Subsequently, each time a call to the subscriber's PTN is made, the CRP identifies the caller, and the subscriber is notified of the call via a page (as discussed in Foladare 2-13-13-17) which includes the call forwarding menu designated by the subscriber for that caller (step 310). The subscriber then selects a menu option from the designated menu and the call is routed accordingly (steps 307 and 308), as discussed above.

Figure 4:
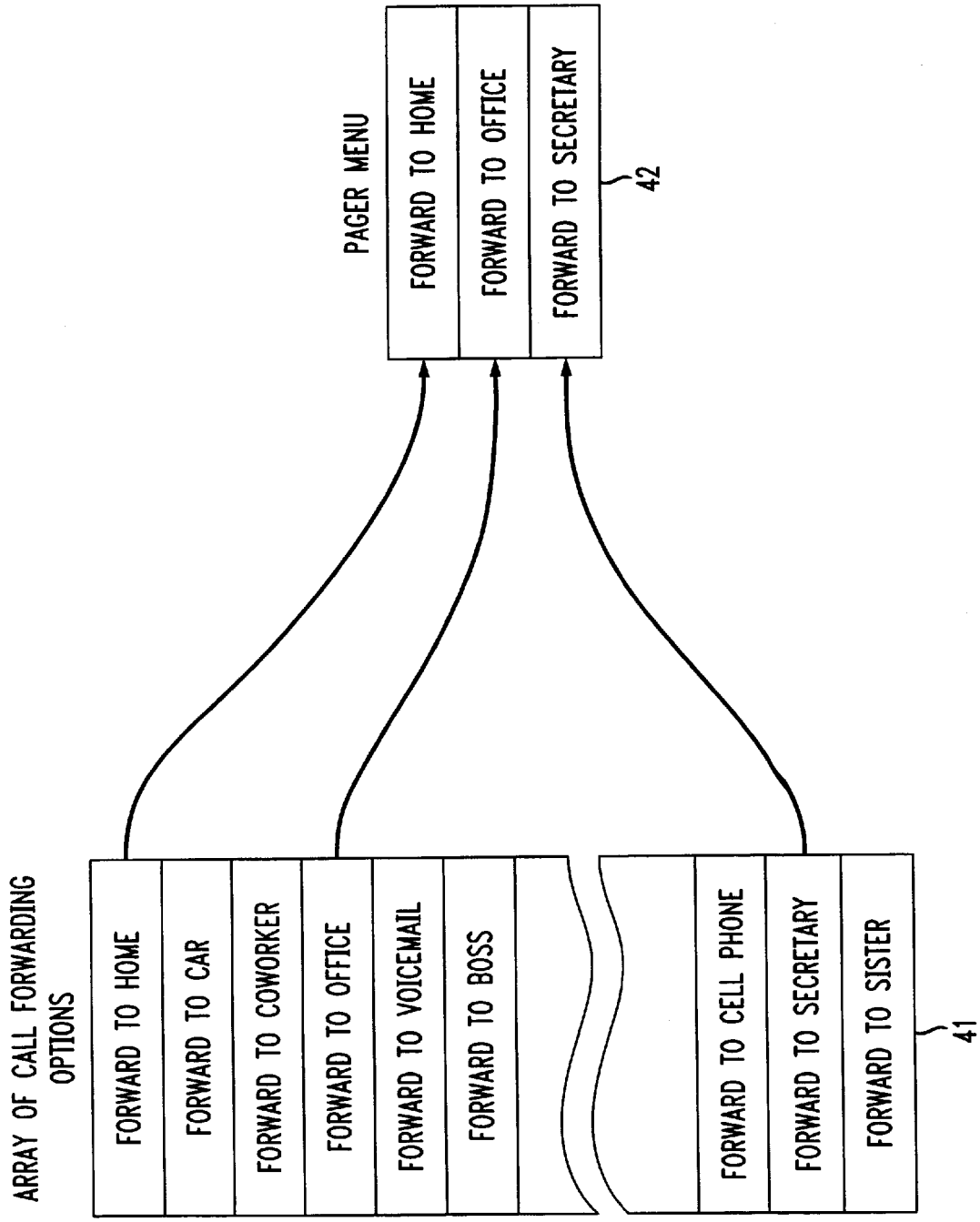
FIG. 4 depicts a sample call forwarding menu configuration which might be created by a subscriber from an array of call forwarding choices in accordance with the present invention.

FIG. 4 depicts a sample call forwarding menu configuration 42 which might be created by a subscriber from an array of call forwarding choices 41 in accordance with the present invention.

FIG. 5 depicts multiple call forwarding menus 52, 53, 54, each to be used in conjunction with particular designated callers, which might be configured by a subscriber from an array of call forwarding choices 51 in accordance with the present invention.

What is claimed is:

1. A method of managing, in a two-way paging communication system, paging menus containing paging-menu options, comprising:
   (a) receiving, from a subscriber, paging-menu options;
   (b) receiving, from a subscriber, information including a first set of callers and a second of callers;
   (c) configuring, using the paging-menu options received in step (a) and information received in step (b), a first paging menu and a second paging menu, the first paging menu corresponding to the first set of callers, and the second paging menu corresponding to the second set of callers; and
   (d) sending to the subscriber, upon creation, the first and second paging menus for storage at a subscriber device.

2. The method of claim 1, further comprising:
   (a) notifying the subscriber, via a paging signal of a two-way pager, of the storage of the first and second paging menus.

3. The method of claim 1, further comprising:
   (a) selecting the paging menu that corresponds to the set of callers to which a caller belongs; and
   (b) forwarding the call based on a paging-menu-option choice in the selected paging menu.

4. A computer-readable medium storing instructions adapted to be executed on a processor to:
   (a) receive, from a subscriber, paging-menu options;
   (b) receive, from a subscriber, information including a first set of callers and a second set of callers;
   (c) configure, using the paging-menu options received in step (a) and information received in step (b), a first paging menu and a second paging menu, the first paging menu corresponding to the first set of callers, and the second paging menu corresponding to the second set of callers; and
   (d) send to the subscriber, upon creation, the first and second paging menus for storage at a subscriber device.

5. The computer-readable medium of claim 4, storing further instructions adapted to be executed on a processor to:
   (a) notify the subscriber, via a paging signal of a two-way pager, of the storage of the first and second paging menus.

6. The computer-readable medium of claim 4, storing further instructions adapted to be executed on a processor to:
   (a) select the paging menu that corresponds to the set of callers to which a caller belongs; and
   (b) forward the call based on a paging-menu-option choice in the selected paging menu.

7. A method of managing paging menus in a two-way paging communication system, comprising the steps of:
   (a) providing for access by a two-way paging communication system subscriber, the subscriber having a unique personal telephone number, via a data network, to a customer routing point database in which paging menu options associated with the subscriber are stored;
   (b) allowing the subscriber to configure at least a first and a second paging menu, and designate a first set of callers corresponding to the first paging menu and designate a second set of callers corresponding to the second paging menu, using the paging menu options stored in the customer routing point database; and
   (c) sending to the subscriber upon creation, the at least first and second configured paging menus for storage by the subscriber device.

8. The method according to claim 7, further comprising the step of:
   (a) notifying the subscriber, via a paging signal to a two-way pager, of the storage of the at least first and second configured paging menus in the customer routing point database.

9. A method of managing paging menus in a two-way paging communication system, comprising the steps of:
   (a) providing for access by a two-way paging communication system subscriber, the subscriber having a unique personal telephone number, via a data network, to a customer routing point database in which paging menu options associated with the subscriber are stored;
   (b) allowing the subscriber to configure at least a first and a second paging menu, and designate a first set of callers corresponding to the first paging menu and designate a second set of callers corresponding to the second paging menu, using the paging menu options stored in the customer routing point database;
   (c) storing the at least first and second configured paging menus in the customer routing point database and in a subscriber device; and
   (d) upon reception of a call to the subscriber's personal telephone number:
      (i) identifying the current caller, determining whether the caller belongs to the first set of callers or to the second set of callers, and selecting the paging menu which corresponds to the set of callers to which the current caller belongs;
      (ii) sending a paging signal to the subscriber, the paging signal including the selected paging menu;
      (iii) accepting a relayed paging menu option choice from the subscriber; and
      (iv) forwarding the call in accordance with the relayed paging menu option choice.

10. The method according to claim 9, further comprising the step of:
    (a) notifying the subscriber, via a paging signal to a two-way pager, of the storage of the at least first and second configured paging menus in the customer routing point database.

11. A method of managing, in a two-way paging communication system, paging menus containing paging-menu options, comprising:
    (a) receiving, from a subscriber, paging-menu options;
    (b) receiving, from a subscriber, information including a first set of callers and a second of callers;
    (c) configuring, using the paging-menu options received in step (a) and information received in step (b), a first paging menu and a second paging menu, the first paging menu corresponding to the first set of callers, and the second paging menu corresponding to the second set of callers;
    (d) selecting, each time a call is placed to the subscriber's personal telephone number, the first paging menu if a call is placed by a calling party in the first set of callers; and
    (d) sending the first paging menu to the subscriber for use by the subscriber.

12. The method of claim 11, further comprising:
(a) notifying the subscriber, via a paging signal of a two-way pager, of the storage of the first and second paging menus.

13. The method of claim 11, further comprising:
(a) forwarding the call based on a paging-menu-option choice in the selected paging menu.

14. A method of managing, in a two-way paging communication system, paging menus containing paging-menu options, said method comprising:
(a) configuring, for a single subscriber, a plurality of paging menus;
(b) storing, in a database, paging menu assignments for the plurality of paging menus, the paging-menu assignments including at least a first calling party and a second calling party, the first calling party being assigned to at least a first paging menu in the plurality of paging menus, and the second calling party being assigned to at least a second paging menu in the plurality of paging menus; and
(c) sending to the single subscriber the plurality of paging menus for use by the subscriber.

15. The method of claim 14, further comprising:
(c) sending, to the subscriber, the plurality of paging menus for storage by the customer.

16. The method of claim 14, further comprising:
(c) selecting, each time a call is placed to the subscriber's personal telephone number, the first paging menu if a call is placed by the first calling party; and
(d) sending the first paging menu to the subscriber.

* * * * *